United States Patent

[11] 3,628,156

[72] Inventor James R. Barger
 Haddon Heights, N.J.
[21] Appl. No. 788,862
[22] Filed Jan. 3, 1969
[45] Patented Dec. 14, 1971
[73] Assignee The United States of America as represented by the Secretary of the Navy

[54] TIMING LOGIC
 6 Claims, 2 Drawing Figs.

[52] U.S. Cl................................................. 328/39,
 307/220, 307/225, 307/269, 328/41, 328/63
[51] Int. Cl...................................................... H03k 23/00
[50] Field of Search........................................... 328/136,
 140, 39, 43, 48, 41, 63; 307/220–225, 269

[56] References Cited
UNITED STATES PATENTS
2,994,790 8/1961 Delaney ...................... 328/48

Primary Examiner—Malcolm F. Hubler
Attorneys—Edgar J. Brower and Henry Hansen

ABSTRACT: Timing logic providing sequential pulses from individual terminals. Modulo N-type counters are cascaded together and provide signals to AND gates so that the AND gates by receiving 12 sequential signals of varying length and sequence may combine the signals in a manner to provide 48 terminals signals in sequence of equal amplitude and duration. Synchronization is obtained to assure that this sequencing remains fixed regardless of turn on states of the equipment.

TIMING LOGIC

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a timing logic system for use in a feature recognition system which processes transient submarine signals occurring in the presence of signallike noise and which further recognizes certain relatively invariant features exhibited by the submarine signals and not by the noise signals.

In the field of submarine detection and recognition, magnetic anomaly detection (MAD) devices and techniques have long been utilized. Basically, MAD is an airborne system employing magnetometer elements which sense the presence of a submerged submarine by measuring the small distortion in the earth's magnetic field caused thereby. This technique is an exacting one as the earth's magnetic field intensity may be on the order of 10,000 times stronger than that of the submarine. Additionally, the high altitudes of the aircraft, or more exactly the long slant ranges to the submarine, cause the signals from the submarine to virtually disappear into the noise background. This noise is derived from a multiplicity of sources as from, for example, the magnetometer sensing element itself, the magnetic and electrical equipments of the aircraft, large magnetic fields external to the aircraft such as geologic mineral deposits beneath the ocean floor, and other phenomena.

Due to these many noise sources and the distance between sensor and submarine, the submarine signal is either completely disguised by the noise such that it cannot be recognized therefrom or the noise signals themselves produce a response similar to the submarine signals such that false recognitions are effectuated.

Prior art systems incorporated a trained human operator who memorized features or patterns known to be representative of the signature of a submarine and whose function it was to visually recognize and extract these submarine signals from data displayed before him. The accuracy of such a technique was relatively low and varied with the individual operator. In addition, all of the operators fatigued with time thus further decreasing accuracy. The result was that many false alarms were indicated and many actual targets were entirely missed.

Thus there arose a need for a system capable of automatically and electronically recognizing and detecting, with a high degree of accuracy and reliability, submarine signals occurring in the presence of signallike noise.

SUMMARY OF THE INVENTION

Accordingly, it is the general purpose of the present invention to provide a logic timing system for use in a feature recognition system which fulfills the need for a highly accurate, fully automatic submarine detection system. The recognition system operates upon incoming MAD signals containing both submarine signals and signallike noise, by abstracting the primary features or positive and negative slopes thereof, and by utilizing and processing these primary features to recognize and detect relatively invariant submarine signals therefrom.

The recognition system is divided into two major functional areas, the preprocessor system and the processor or signal recognition and detection system. Both systems are controlled by the timing logic. The preprocessor receives MAD amplitude-time domain information (i.e., varying amplitude signals in the time domain) and passes them through a plurality of filter channels each having a different bandwidth and center frequency to provide time waveforms in the amplitude-time-frequency domain (i.e., signals varying in both amplitude and frequency but having the same time base as the received MAD signals). Thereafter, the preprocessor both prepares the amplitude-time-frequency domain primary signals for (slope) feature abstraction and actually performs the feature abstraction operation. The processor receives the primary feature abstracted signals and detects and recognizes therefrom the relative presence of invariant submarine signals or features as a function of degree of probability of detection and slant range from airborne feature recognition system to submerged submarine.

Timing for the various sequences of events is accomplished through the use of a precision tuning fork oscillator and associated timing logic circuitry. More particularly, the timing logic derives (from the tuning fork oscillator) range timing intervals, channel timing intervals, and switch drive waveforms for use by the feature recognition system. Clock frequencies are also developed for use by the recognition logic of the processor.

The timing logic includes a plurality of modulo N-type counters cascaded together and connected through appropriate AND gates to a countersynch flip-flop which serves to maintain synchronization among the counters irrespective of the states thereof at equipment turn on. By ANDING preselected outputs of the various counters, the aforementioned timing intervals and switch drive waveforms are obtained. In addition to driving the counters, the tuning fork oscillator also feeds a binary counter which is used to develop clock frequencies for use in the processor.

DESCRIPTION OF THE PREFERRED EMBODIMENT

Figure 1:
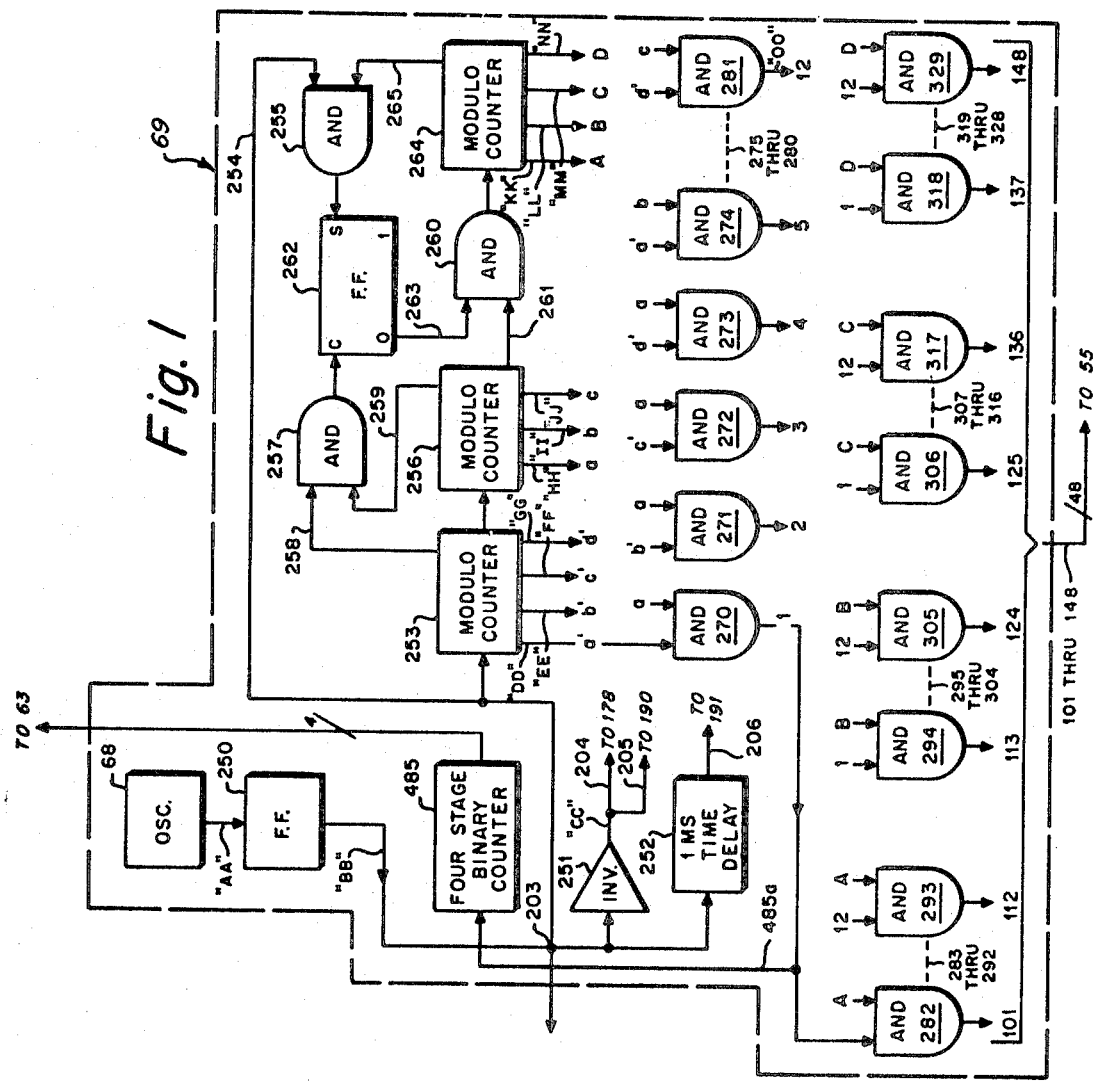
FIG. 1 is a block diagram of the timing logic.

Referring now to FIG. 1 the timing system and associated logic will be described. Functionally, the timing logic 69 takes the system clock or tuning fork oscillator 68 output and derives the range timing intervals, channel timing intervals, and switch drive waveforms for the various components of the overall system. Also provided are various clock frequencies for use in the recognition logic of the processor.

A tuning fork oscillator 68 provides a square wave output of 3,840 Hz. to the timing logic 69. At the input of logic 69 is a divide by two flip-flop 250, the input of which is connected to the oscillator 68 output, and the output of which is connected via line 203 to the input of switch 177 (not shown) and through an inverter 251 (via lines 204 and 205) and a 1 millisecond time delay 252 (via line 206) to, respectively, switches 178, 190, and 191 in the feature abstractor (not shown). The output of flip-flop 250 is also connected to an N-type modulo counter 253, and additionally connected via line 254 to the input of a two-input AND-gate 255. Modulo counter 253 is connected to a second modulo counter 256 and also to a second two-input AND-gate 257 via the line 258. Modulo counter 256 is itself connected to the second input of gate 257 via line 259 and is further connected to a two-input AND-gate 260 via line 261. Both AND-gates 255 and 257 are connected to a flip-flop 262, AND-gate 255 being connected to the set ($s$) input thereof, while AND-gate 257 is connected to the clear ($c$) input thereof. Flip-flop 262 is connected to AND-gate 260 from its "0" output via line 263. AND-gate 260 is connected at its output to a modulo counter 264 which, in turn, is connected to the second input of two-input gate 255 via line 265.

Modulo counters 253, 256, and 264 are of the shift register type commonly known in the art as modulo $n$ counters. Each counter comprises a plurality of cascaded flip-flops and a NAND gate in the feedback loop thereof to insure that only one "1" circulates in a counter at a time. Counter 253 is a modulo four counter in that it divides an incoming pulse by four. Accordingly, it contains four flip-flops. Similarly, counter 256 is a divide by three, and counter 264 is a divide by four. The outputs $a40$, $b'$, $c'$, and $d'$ from counter 253 are ANDED with outputs a, b, and c from modulo counter 256 by twelve twohinput AND-gates 270–281, inclusive, output a being ANDED respectively with each of the four outputs of modulo 253, then output b being so ANDED and so on until 12 outputs are achieved. These 12 outputs are labeled 1–12, inclusive. EAch of these is ANDED with the four outputs A,B,C, and D of modulo counter 264. This ANDING is accomplished through the use of 48 two-input AND-gates 282–329 inclusive. The aforementioned 12 AND-gates 270–281, inclusive, provide the channel timing levels (the eleven filter channels plus the one grounded channel). The 48 two-input AND-gates 282–329, inclusive, provide the multiplexing levels for the system. AND-gate 270 if further connected via line 485a to a four-stage binary counter 485. The counter provides four timing signals to the recognition logic 63 (not shown).

TABLE II

MODULO 253 OUTPUTS ANDED WITH MODULO 256

OUTPUTS TO OBTAIN CHANNEL TIMING LEVELS

| Modulo 253 | Modulo 256 | | | |
|---|---|---|---|---|
| a | a | a'a=1 | a'b=5 | a'c=9 |
| b' | b | b'a=2 | b'b=6 | b'c=10 |
| c' | c | c'a=3 | c'b=7 | c'c=11 |
| d' | | d'a=4 | d'd=8 | d'c=12 |

TABLE III

MODULO 260 OUTPUTS "ANDED" WITH CHANNEL TIMING

LEVELS TO OBTAIN MULTIPLEXING LEVELS

| Channel Timing Levels | Modulo 260 | | | | |
|---|---|---|---|---|---|
| 1 | A | 1A | 1B | 1C | 1D |
| 2 | B | 2A | 2B | 2C | 2D |
| 3 | C | 3A | 3B | 3C | 3D |
| 4 | D | 4A | 4B | 4C | 4D |
| 5 | | 5A | 5B | 5C | 5D |
| 6 | | 6A | 6B | 6C | 6D |
| 7 | | 7A | 7B | 7C | 7D |
| 8 | | 8A | 8B | 8C | 8D |
| 9 | | 9A | 9B | 9C | 9D |
| 10 | | 10A | 10B | 10C | 10D |
| 11 | | 11A | 11B | 11C | 11D |
| 12 | | 12A | 12B | 12C | 12D |

In operation the tuning fork oscillator 68 provides a continuous train of pulses which are divided by two by flip-flop 250 and fed to modulo 253 thereby causing the counter to circulate. Since this is a divide by four counter the final stage thereof provides an output pulse train having one-fourth the number of pulses per second than the input pulse train. This pulse train is fed to modulo 256 causing this counter to circulate. In turn, the last stage of this counter (a divide by three counter) supplies to modulo counter 264 through AND-gate 260 a pulse train having one-third the pulses per second of its pulse train or one-twelfth the pulses per second from flip-flop 250. The twelve channel timing levels are then derived by combining the modulo 253 and modulo 256 count levels through the two-input logic gates 270–281, inclusive. Multiplexing levels are obtained by further combining the now formed channel levels with the modulo 264 range levels, A, B, C, and D, through the forty-eight AND-gates 282–329, inclusive.

Flip-flop 262 may be considered as a countersink flip-flop and serves to synchronize the three counters so that the multiplexing levels always occur in the same sequence regardless of the states of the three counters at equipment turn on. This is necessary as it is difficult when using a number of small modulo n counters to maintain them in perfect synchronism so that the counts always follow the same order and further so that there are no ambiguous counts. Synchronization is effectuated by permitting all three counters to circulate initially and to stop the final modulo counter 264, the slowest of the counters, at the time it has reached a predetermined initial state level as, for example, all zeros. Then, by permitting the first two counters to circulate until they have simultaneously reached a predetermined state level, as for example a "one" at the final stage of each thereof, and by utilizing these two levels in combination as an input to synchronizing flip-flop 262, synchronization can be assured.

In operation, when the predetermined level state of all zeros appears in modulo counter 264 an output therefrom via line 265 in combination with the continuously fed pulse train from flip-flop 250 along line 254 enables the AND-gate 255 to set the flip-flop 262 thereby inhibiting it and providing a zero output therefrom along the line 263. This inhibits the AND-gate 260 and prevents the pulses from modulo 256 to feed modulo 264. Modulo 264 thus remains in this predetermined state until the predetermined states of modulos 253 and 256 are reached whereupon, simultaneously, outputs from the respective counters along lines 258 and 259 enable the AND-gate 257. Having been enabled, AND-gate 257 provides a clear signal to flip-flop 262 which, responsive thereto, provides an enabling "1" along the line 263 to enable AND-gate 260 and thereby permit succeeding counter 256 levels to pass to the modulo counter 264.

Since the pulses along lines 258 and 259 are never inhibited, the synchronizing flip-flop 262 will always start in a cleared state so that modulo counter 264 will count until the desired initial state level (all zeros) is reached at which time the synchronization action may proceed as noted hereinabove. If at any time noise pulses cause an extra count to appear in modulo counter 264 resynchronization will be automatic. This will occur within one time frame of modulo counter 264 since the synchronization is rechecked at the desired initial state level in each time frame. It is noted that the modulo counters make it possible to perform the necessary multiplexing and demultiplexing of the MAD energy signal levels with only two-input AND gates and with a resultant saving in logic circuitry and complexity. If a straight binary counter were used the multiplexing gates would have to be four input gates requiring twice the number of integrated circuits. It is further noted that since only 36 demultiplexing switches are utilized while 48 timing levels are available, the additional 12 thereof are left unconnected. More particularly gates 291, inclusive; gates 295–303, inclusive, gates 307–315, inclusive; and gates 319–327, inclusive, are connected, respectively, to switches 230–265, while gates 282, 292, 293, 294, 304, 305, 306, 316, 317, 318, 328, and 329 are left unconnected with respect to the demultiplexing switches.

Figure 2:
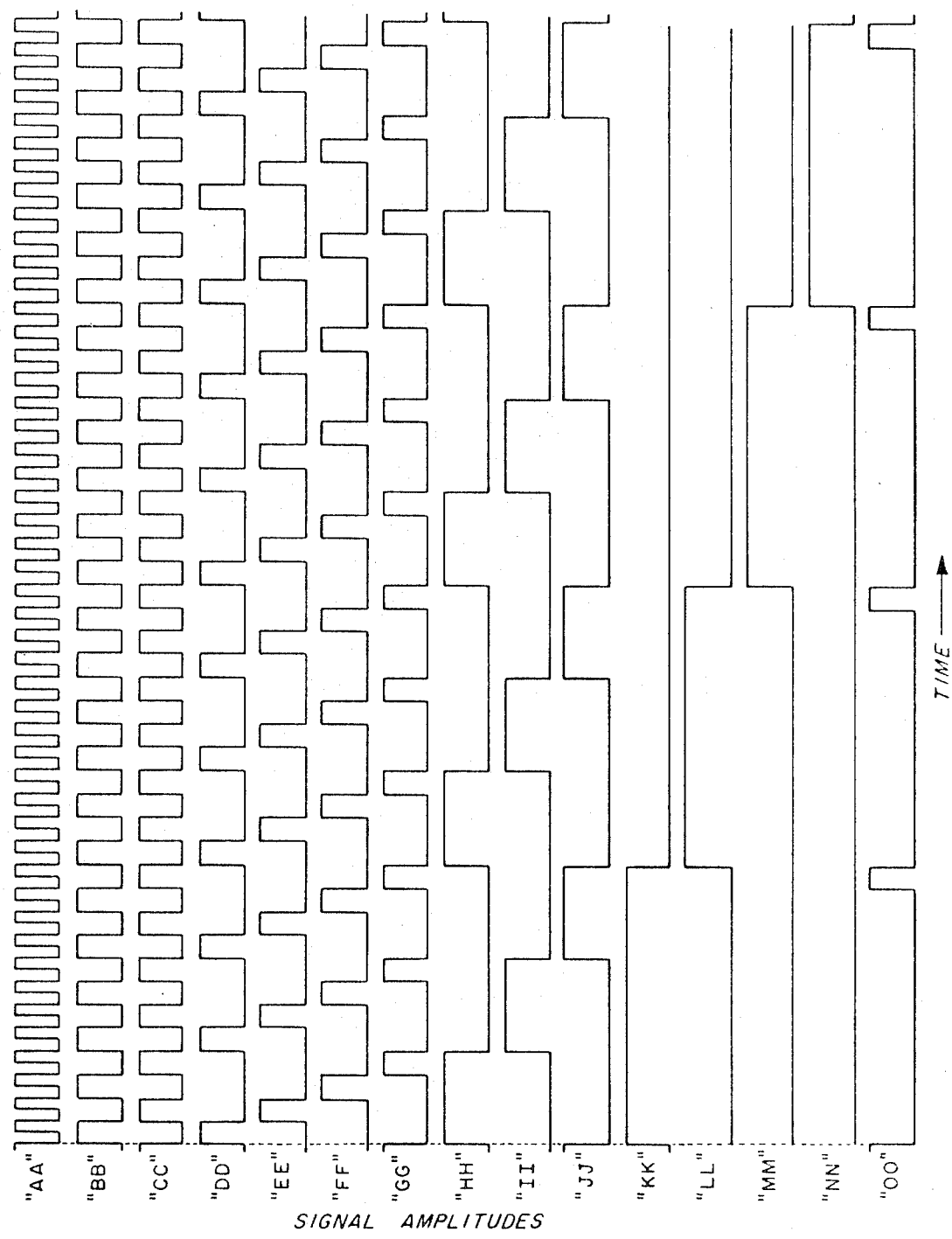
FIG. 2 is a timing diagram showing the various waveforms generated by the timing logic of FIG. 1.

Referring now to FIG. 2 the timing waveforms generated by the tuning fork oscillator 68 and timing logic 69 are shown. These waveforms are identified by letter symbols, these symbols being shown in FIG. 1, to indicate from whence they were derived. Thus, the waveform AA is the oscillator or clock frequency. This frequency is divided by two by flip-flop 250 to form the 500 microseconds pulse train BB which, in turn, is inverted by inverter 251 to form the pulse train CC. Pulse train BB is fed to modulo counter 253 wherefrom THE WAVEFORMS DD, EE, FF, and GG are derived from the outputs of the first, second, third, and fourth flip-flops therein, respectively. Waveforms HH, II, and JJ are taken respectively from the flip-flops of modulo counter 256 along lines a, b, and c of FIG. 9 as shown. In like manner the waveforms KK, LL, MM, and NN are taken at the outputs respectively of the four flip-flops in modulo counter 264. The multiplexing is achieved by the "ANDING" procedure discussed hereinbefore. More particularly, and for example, the "ANDING" of waveforms DD–GG, inclusive, with the waveform HH produces the multiplexing channel levels for respectively range 1, channels 1, 2, 3, and 4. Accordingly, the "ANDING" of waveforms DD-GG, inclusive, with HH-JJ, inclusive, produces the 12 channel levels. Thus, waveform OO is the channel 12 reference pulse and is derived by "ANDING" waveform GG with JJ. Further, the "ANDING" of the 12 channel timing levels with the waveforms KK-NN, inclusive, provides the range timing levels for the system.

Obviously many modifications and variations of the present invention are possible in the light above teachings. It is therefore to be understood that within the scope of the appended claims the invention may be practiced otherwise than as specifically described.

What is claimed is:

I claim:

1. A logic system for providing timing pulses comprising:
first means providing a first pulse train of predetermined frequency;
a plurality of counter means operatively connected to said first means for providing sequential signals at respective ones of a plurality of output terminals indicative of predetermined integer divisions of said first pulse train including, first counter means operatively connected to said first means for providing a second pulse train fractionally related to said first pulse train, second counter means operatively connected to said first counter means for providing a third pulse train fractionally related to said second pulse train, and third counter means operatively connected to said second counter means receiving said second pulse train for providing a fourth pulse train fractionally related to said third pulse train; and
synchronizing means receiving said first pulse train and operatively connected to said plurality of counter means for synchronizing the respective counts thereof thereby to insure that said counts always follow the same order and further to insure that there are not ambiguous counts including, a flip-flop having at least a clear input and a set input, first logic gate means operatively connected to said first means and said third counter means for providing a signal to said set input upon the coincidence of input signals to said first logic gate means, second logic gate means operatively connected to said first counter means and said second counter means for providing a signal to said clear input upon the coincidence of input signals supplied to said second logic gate means, and third logic gate means operatively connected to receive the outputs signals of said second counter means and said flip-flop means for providing an output signal in response to the coincidence of said received signals.

2. A logic system for providing timing pulses according to claim 1 wherein said first means comprises:
oscillator means providing a pulse train; and
means operatively connected to said oscillator means for dividing by two the pulse train provided by said oscillator means.

3. A logic system for providing timing pulses according to claim 2 wherein:
said first, second, and third counters are modulo counters;
said first modulo counter divides by four said first pulse train;
said second modulo counter divides three said second pulse train; and
said third modulo counter divides by four said third pulse train.

4. A logic system for providing timing pulses according to claim 3 further comprising:
a first plurality of gate means operatively connected to said first modulo counter and said second modulo counter for combining the respective output signals therefrom.

5. A logic system for providing timing pulses according to claim 4 further comprising:
a second plurality of gate means operatively connected to the respective outputs of said first plurality of gate means and said third modulo counter for combining the respective output signals therefrom.

6. A logic system for providing timing pulses according to claim 5 wherein:
said first plurality comprises 12 two-input AND gates; and plurality comprises 48 two-input AND gates.

* * * * *